United States Patent
Liu et al.

(10) Patent No.: US 10,599,194 B2
(45) Date of Patent: Mar. 24, 2020

(54) ACCOMMODATION STRUCTURE FOR SELECTIVELY ACCOMMODATING DIFFERENT TYPES OF STORAGE DEVICES AND ELECTRONIC DEVICE INCLUDING THE SAME

(71) Applicant: WISTRON CORP., New Taipei (TW)

(72) Inventors: Chi-Yi Liu, New Taipei (TW); The-Fa Wang, New Taipei (TW); Chia-Ming Shih, New Taipei (TW)

(73) Assignee: WISTRON CORP., New Taipei (TW)

( * ) Notice: Subject to any disclaimer, the term of this patent is extended or adjusted under 35 U.S.C. 154(b) by 6 days.

(21) Appl. No.: 15/938,966

(22) Filed: Mar. 28, 2018

(65) Prior Publication Data

US 2019/0163244 A1 May 30, 2019

(30) Foreign Application Priority Data

Nov. 28, 2017 (TW) .............................. 106141327 A

(51) Int. Cl.
*G06F 1/18* (2006.01)
*G11B 33/12* (2006.01)
*G11B 25/10* (2006.01)

(52) U.S. Cl.
CPC .............. *G06F 1/187* (2013.01); *G11B 25/10* (2013.01); *G11B 33/122* (2013.01); *G11B 33/126* (2013.01)

(58) Field of Classification Search
CPC ................................ G06F 1/187; G11B 33/122
See application file for complete search history.

(56) References Cited

U.S. PATENT DOCUMENTS

| 8,432,684 | B2* | 4/2013 | Wu | G06F 1/185 |
| | | | | 361/679.41 |
| 9,443,558 | B1* | 9/2016 | Hung | G11B 33/124 |
| 9,583,153 | B1* | 2/2017 | Sarraf | G06F 1/187 |
| 2003/0047524 | A1* | 3/2003 | Sato | G02B 6/4452 |
| | | | | 211/1 |
| 2009/0231799 | A1* | 9/2009 | Kouyama | G06F 1/187 |
| | | | | 361/679.31 |
| 2013/0322007 | A1* | 12/2013 | Yang | G11B 33/126 |
| | | | | 361/679.31 |

(Continued)

FOREIGN PATENT DOCUMENTS

| TW | 201210444 A1 | 3/2012 |
| TW | I556715 B | 11/2016 |
| TW | M533797 U | 12/2016 |

OTHER PUBLICATIONS

Taiwanese Office Action for corresponding application 106141327, dated Sep. 20, 2018.

*Primary Examiner* — Daniel P Wicklund
*Assistant Examiner* — Christopher L Augustin
(74) *Attorney, Agent, or Firm* — Maschoff Brennan

(57) ABSTRACT

An accommodation structure includes a frame, a first connector disposed on a first side of the frame, and a second connector disposed on a second side of the frame. When the first storage device is connected to the first connector, the first storage device occupies a first portion of the accommodation space. When the second storage device is connected to the second connector, the second storage device occupies a second portion of the accommodation space. In addition, the first portion at least partially overlaps the second portion.

15 Claims, 10 Drawing Sheets

(56) References Cited

U.S. PATENT DOCUMENTS

| | | | |
|---|---|---|---|
| 2014/0049897 A1* | 2/2014 | Hoss | G06F 1/187 |
| | | | 361/679.31 |
| 2016/0128220 A1 | 5/2016 | Chen et al. | |
| 2017/0220505 A1* | 8/2017 | Breakstone | G06F 13/4022 |
| 2017/0249974 A1* | 8/2017 | Mueller | H04N 5/765 |
| 2017/0308135 A1* | 10/2017 | Wang | G06F 1/181 |
| 2017/0329373 A1* | 11/2017 | Ehlen | G11B 33/124 |
| 2017/0371383 A1* | 12/2017 | Yang | G06F 1/185 |
| 2018/0210517 A1* | 7/2018 | Yun | G06F 1/181 |

\* cited by examiner

ACCOMMODATION STRUCTURE FOR SELECTIVELY ACCOMMODATING DIFFERENT TYPES OF STORAGE DEVICES AND ELECTRONIC DEVICE INCLUDING THE SAME

CROSS-REFERENCE TO RELATED APPLICATIONS

This non-provisional application claims priority under 35 U.S.C. § 119(a) on Patent Application No(s). 106141327 filed in Taiwan on Nov. 28, 2017, the entire contents of which are hereby incorporated by reference.

TECHNICAL FIELD

The disclosure relates to an internal structure of an electronic device, more particularly to an accommodation structure and an electronic device including the same.

BACKGROUND

With the development of technology, becoming thinner and more lightweight are current trends for electronic devices. However, with the trends, the inner space of the electronic devices is getting smaller and smaller. Therefore, how to effectively utilize the inner space with such limitation becomes an important issue when designing the electronic devices.

SUMMARY

In order to address the aforementioned issue, one embodiment of the present disclosure provides an accommodation structure. The accommodation structure includes a frame, a first connector and a second connector. The frame includes a plurality of side walls surrounding and cooperatively forming an accommodation space. The accommodation space is configured for selectively accommodating one of a first storage device and a second storage device. The first connector is disposed on a first side of the frame and configured to be connected to the first storage device. When the first storage device is connected to the first connector, the first storage device occupies a first portion of the accommodation space. The second connector is disposed on a second side of the frame and configured to be connected to the second storage device. When the second storage device is connected to the second connector, the second storage device occupies a second portion of the accommodation space. In addition, the first portion at least partially overlaps the second portion.

Furthermore, another embodiment of the present disclosure provides an electronic device, which includes a storage device, a frame, a first connector and a second connector. The storage device is selected from a group comprising a first storage device and a second storage device. The frame includes a plurality of side walls surrounding and cooperatively forming an accommodation space. The accommodation space is configured for accommodating the storage device. The first connector is disposed on a first side of the frame. When the storage device is the first storage device, the first connector is configured to be connected to the first storage device, and the first storage device is located at a first portion of the accommodation space. The second connector is disposed on a second side of the frame. When the storage device is the second storage device, the second connector is configured to be connected to the second storage device, and the second storage device is disposed on a second portion of the accommodation space. In addition, the first portion at least partially overlaps the second portion.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
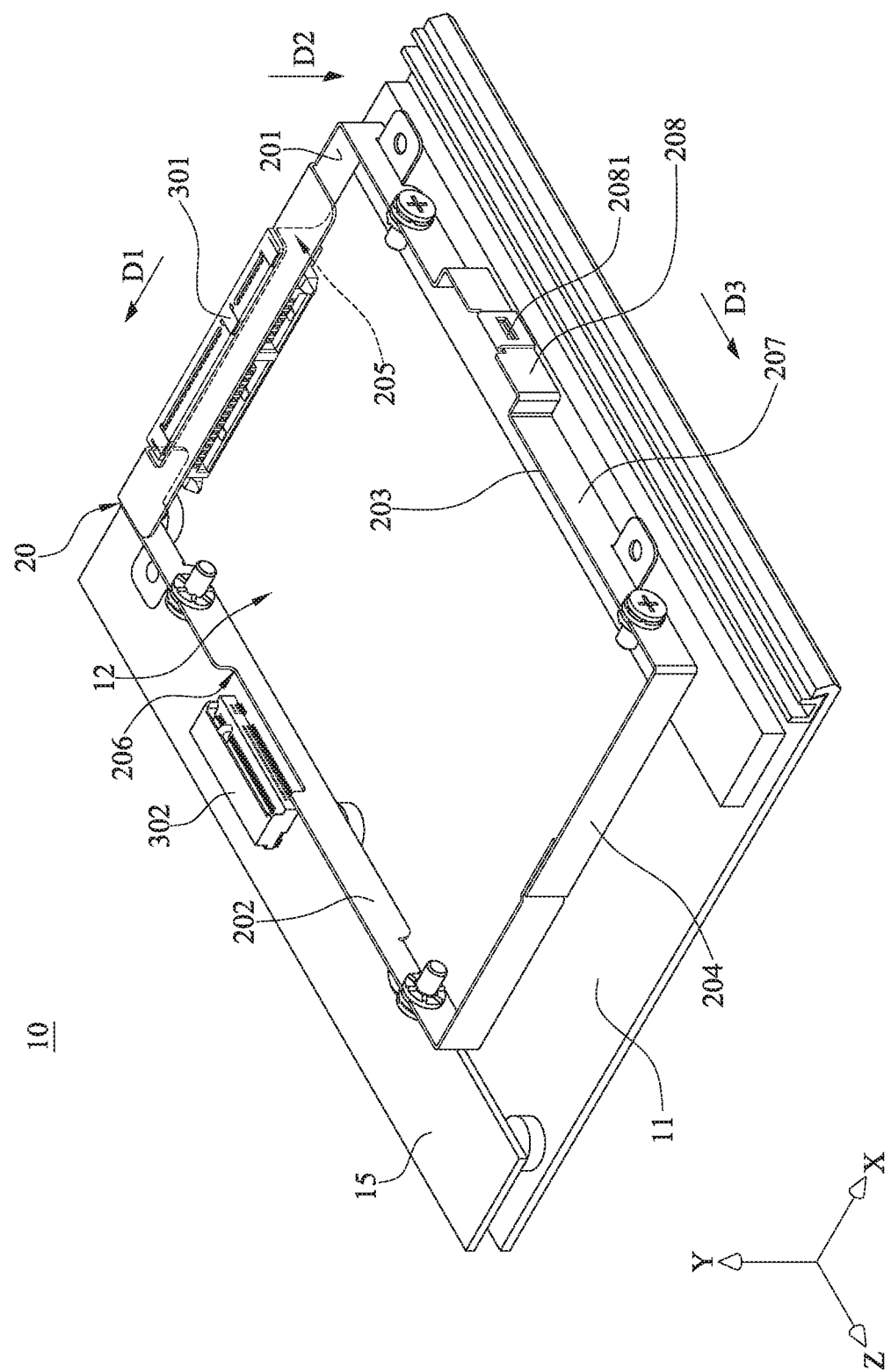
FIG. 1 is a perspective view of an accommodation structure in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known accommodation structures and devices are schematically shown in order to simplify the drawing.

As shown in FIG. 1, according to one embodiment of the present disclosure, an accommodation structure 10 includes a frame 20, a first connector 301, and a second connector 302.

In this embodiment, the frame 20 is fixed on a base plate 11. The base plate 11 is a component of, for example, a server, a notebook computer, a desktop computer, a printed circuit board, or any other support member. Further, the frame 20 has an accommodation space 12. In this embodiment, the frame 20 includes a first side wall 201, a second side wall 202, a third side wall 203, and a fourth side wall 204. Two ends of the first side wall 201 are respectively connected to the second side wall 202 and the third side wall 203. The first side wall 201, the second side wall 202, the third side wall 203, and the fourth side wall 204 cooperatively form the accommodation space 12. In this embodiment, the first side wall 201 is perpendicular to the second side wall 202, and the second side wall 202 is parallel to the third side wall 203.

Figure 2:
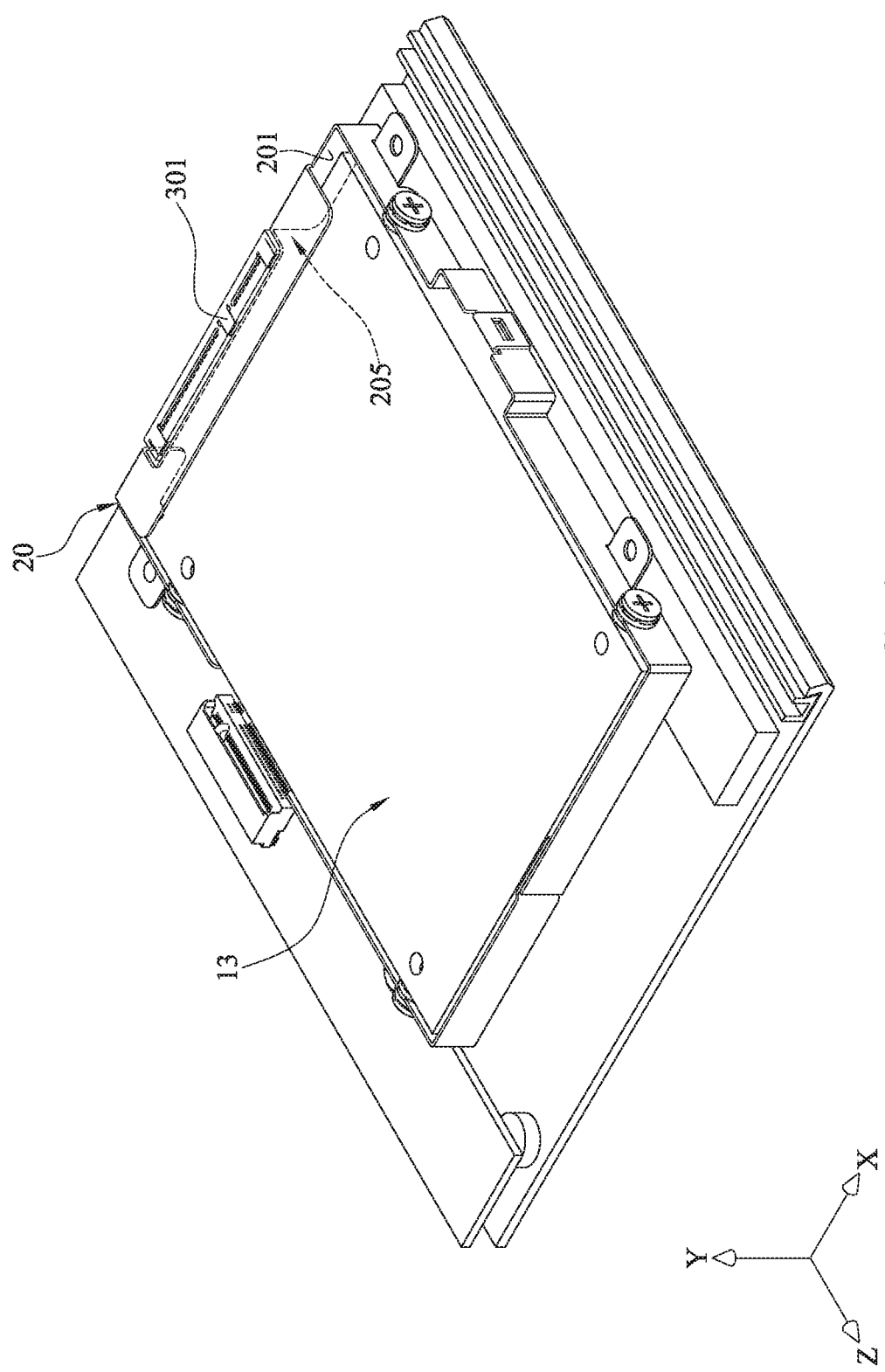
FIG. 2 is a perspective view of the accommodation structure in FIG. 1 when a first storage device is electrically connected thereto.
Figure 3:
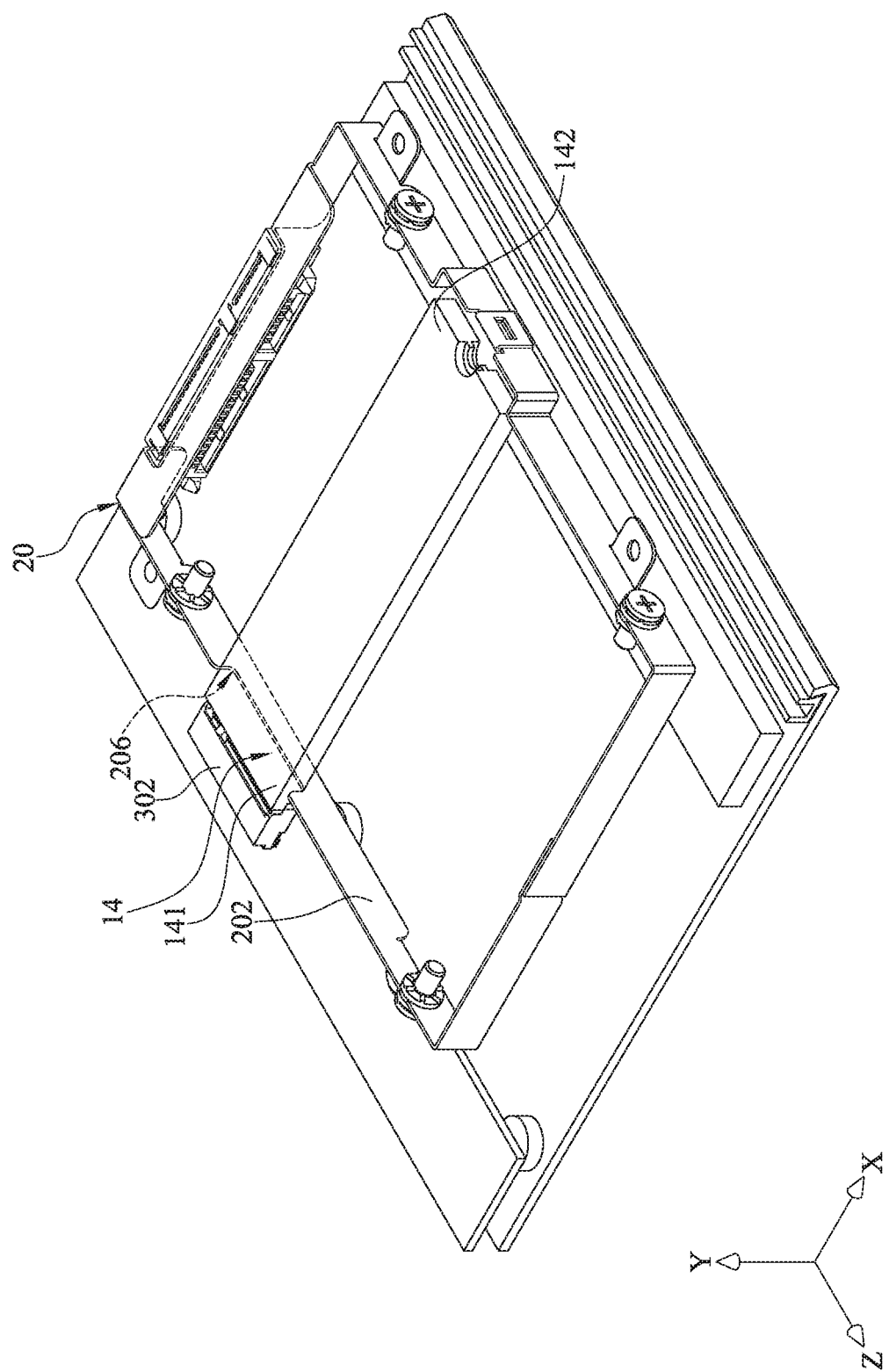
FIG. 3 is a perspective view of the accommodation structure in FIG. 1 when a second storage device is electrically connected thereto.

As shown in FIG. 2 and FIG. 3, according to one embodiment of the present disclosure, the accommodation structure 10 in FIG. 1 is an internal component of an electronic device (not shown in figures). Besides the accommodation structure 10, the electronic device further includes a storage device. The storage device is selected from a group including a first storage device 13 (as shown in FIG. 2) and a second storage device 14 (as shown in FIG. 3). In other words, a user may selectively install the first storage device 13 or the second storage device 14 into the accommodation structure 10 according to actual requirements.

As shown in FIG. 1 and FIG. 2, the first connector 301 is disposed on a first side of the frame 20 corresponding to the first side wall 201. When the first storage device 13 is attempted to be disposed in the accommodation structure 10, the first connector 301 is able to be electrically connected to the first storage device 13. In this embodiment and other embodiments of the present disclosure, the first side wall 201 further has a first opening 205. When the first storage device 13 is electrically connected to the first connector 301 and then is disposed in the accommodation space 12, the first storage device 13 is disposed through the first opening 205 and occupies a first portion of the accommodation space 12. In this embodiment, the volume of the first portion is equal to or substantially equal to the volume of the accommodation space 12. Furthermore, in this embodiment, the first connector 301 is a serial advanced technology attachment (SATA) connector, and the first storage device 13 is a hard disk drive (HDD). However, in other embodiments of the present disclosure, the first connector 301 may be a cable connector or a peripheral component interconnect express (PCIE) connector, and the first storage device 13 may be a solid state drive (SSD) or a random access memory (RAM), but the present disclosure is not limited thereto.

As shown in FIG. 1 and FIG. 3, the second connector 302 is disposed on a printed circuit board (PCB) 15 and located on a second side of the frame 20 corresponding to the second side wall 202. When the second storage device 14 is attempted to be disposed in the accommodation structure 10, the second connector 302 is able to be electrically connected to a connecting end 141 of the second storage device 14. In this embodiment and other embodiments of the present disclosure, the second side wall 202 further has a second opening 206. When the connecting end 141 of the second storage device 14 is electrically connected to the second connector 302 and then the second storage device 14 is disposed in the accommodation space 12, the second storage device 14 is disposed through the second opening 206 and occupies a second portion of the accommodation space 12. In this embodiment, the volume of the second portion is smaller than the volume of the first portion, but the present disclosure is not limited thereto. The volumes of the first portion and the second portion may be changed depending on the size of respective storage devices. In this embodiment, the second connector 302 is a SATA connector, and the second storage device 14 is an SSD. However, in other embodiments of the present disclosure, the second connector 302 may be a cable connector or a PCIE connector, and the second storage device 14 may be a HDD or a RAM, but the present disclosure is not limited thereto.

As shown in FIG. 2 and FIG. 3, when the first connector 301 is electrically connected to the first storage device 13, the first portion of the accommodation space 12 is occupied by the first storage device 13. When the second connector 302 is electrically connected to the second storage device 14, the second portion of the accommodation space 12 is occupied by the second storage device 14. In this embodiment, a part of the first portion overlaps the second portion. That is, the first storage device 13 and the second storage device 14 share the accommodation space 12 of the frame 20. However, in other embodiments of the present disclosure, the second portion may partially overlap or completely overlap the first portion. The amount that the first portion overlaps the second portion may be determined by how much distances from the base plate 11 to the first connector 301 and the second connector 302 and the thicknesses of the first connector 301 and the second connector 302. For example, when the second storage device 14 is thinner than the first storage device 13, the second portion may completely overlap the first portion.

Figure 4:
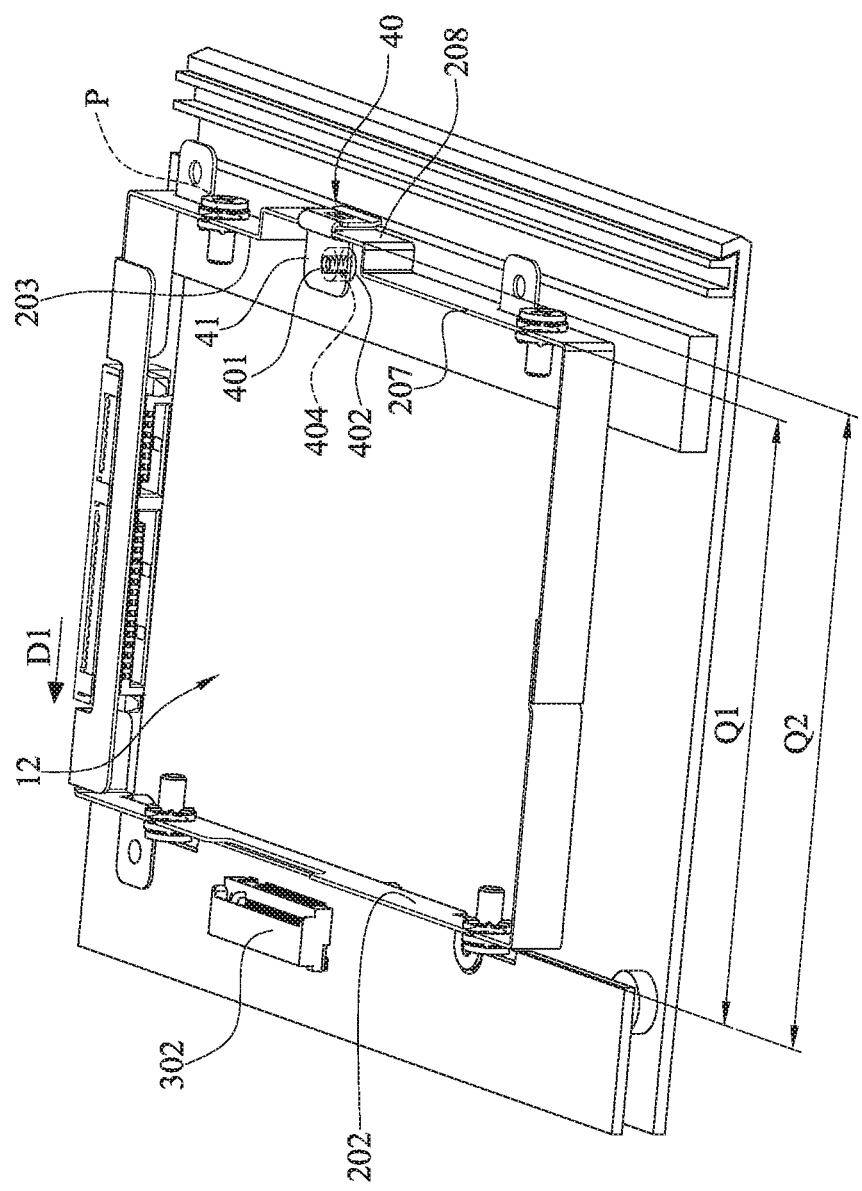
FIG. 4 is a perspective view of the accommodation structure in FIG. 1 and a positioning structure thereof in accordance with one embodiment of the disclosure.

According to one embodiment of the present disclosure as shown in FIG. 4, the accommodation structure 10 further includes a positioning structure 40 configured for positioning a free end 142 (FIG. 3) of the second storage device 14 with respect to the frame 20. The positioning structure 40 is disposed on the third side wall 203 and corresponds to the second connector 302. The positioning structure 40 includes a supporting part 41 extending in a first direction D1 (i.e., −X direction), and the first direction D1 extends from the positioning structure 40 to the second connector 302. When the second connector 302 is electrically connected to the connecting end 141 of the second storage device 14 in FIG. 3, the free end 142 of the second storage device 14 is supported by the supporting part 41.

According to the embodiment as shown in FIG. 4 or other embodiments of the present disclosure, the positioning structure 40 includes a mounting part 402, and the supporting part 41 further has a mounting hole 401. The mounting part 402 is located beneath the supporting part 41, and the mounting part 402 has inner threads on the mounting hole 401. A fastener (e.g., a screw) may be disposed through the mounting hole 401 and threaded into the inner threads so as to fix the free end 142 of the second storage device 14 to the supporting part 41 of the positioning structure 40.

As shown in FIG. 4, the third side wall 203 further includes a first part 207 and a second part 208. The first part 207 is connected to the second part 208. The first part 207 has, but not limited to, two mounting holes P. Fasteners (e.g., screws) may be disposed through the mounting holes P to fix the first storage device 13 in FIG. 4 in position. The positioning structure 40 is disposed on the second part 208. In this embodiment, the positioning structure 40 is detachably disposed on the second part 208, but the present disclosure is not limited thereto. In another embodiment, the positioning structure and the second part may be of a single piece which is formed by, for example, stamping a single metal sheet. In addition, there is a level difference (or a step) between the first part 207 and the second part 208. That is, a distance between the first part 207 and the second side wall 202 is different from a distance between the second part 208 and the second side wall 202. For instance, as shown in FIG. 4, a distance Q1 between the first part 207 and the second side wall 202 is smaller than a distance Q2 between the second part 208 and the second side wall 202. In this embodiment and other embodiments of the present disclosure, the level difference (or the step) between the first part 207 and the second part 208 is able to prevent a mechanical interference between the first storage device 13 and the positioning structure 40 when the first connector 301 is electrically connected to the first storage device 13. However, the second part 208 is optional. For example, in other embodiments of the present disclosure, if the first storage device is spaced a sufficient distance with the second part when being disposed in the accommodation space, the third side wall may have no second part 208 to create such step.

Figure 5A:
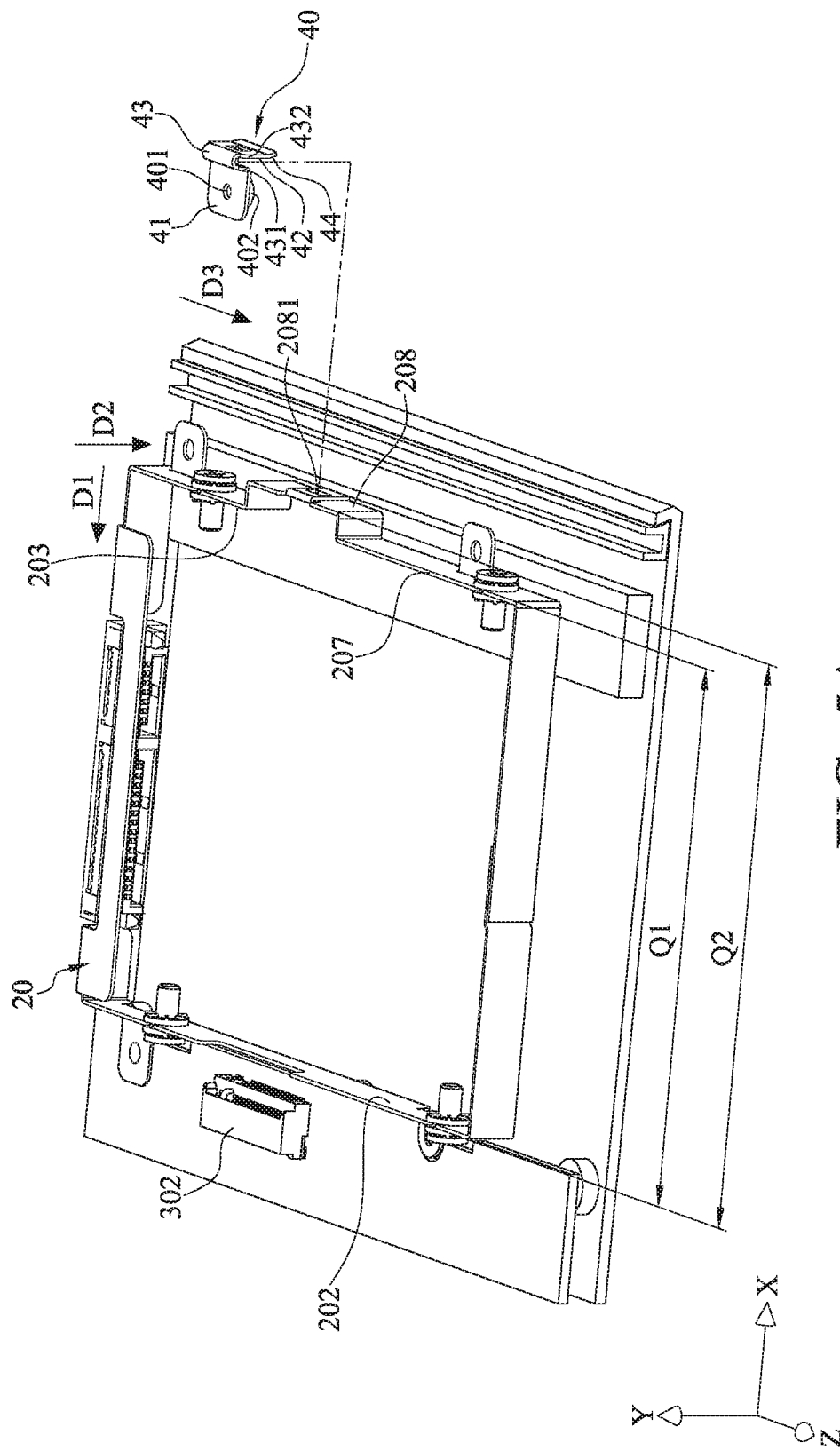
FIG. 5A is an exploded view of a frame and the position structure in FIG. 4.
Figure 5B:
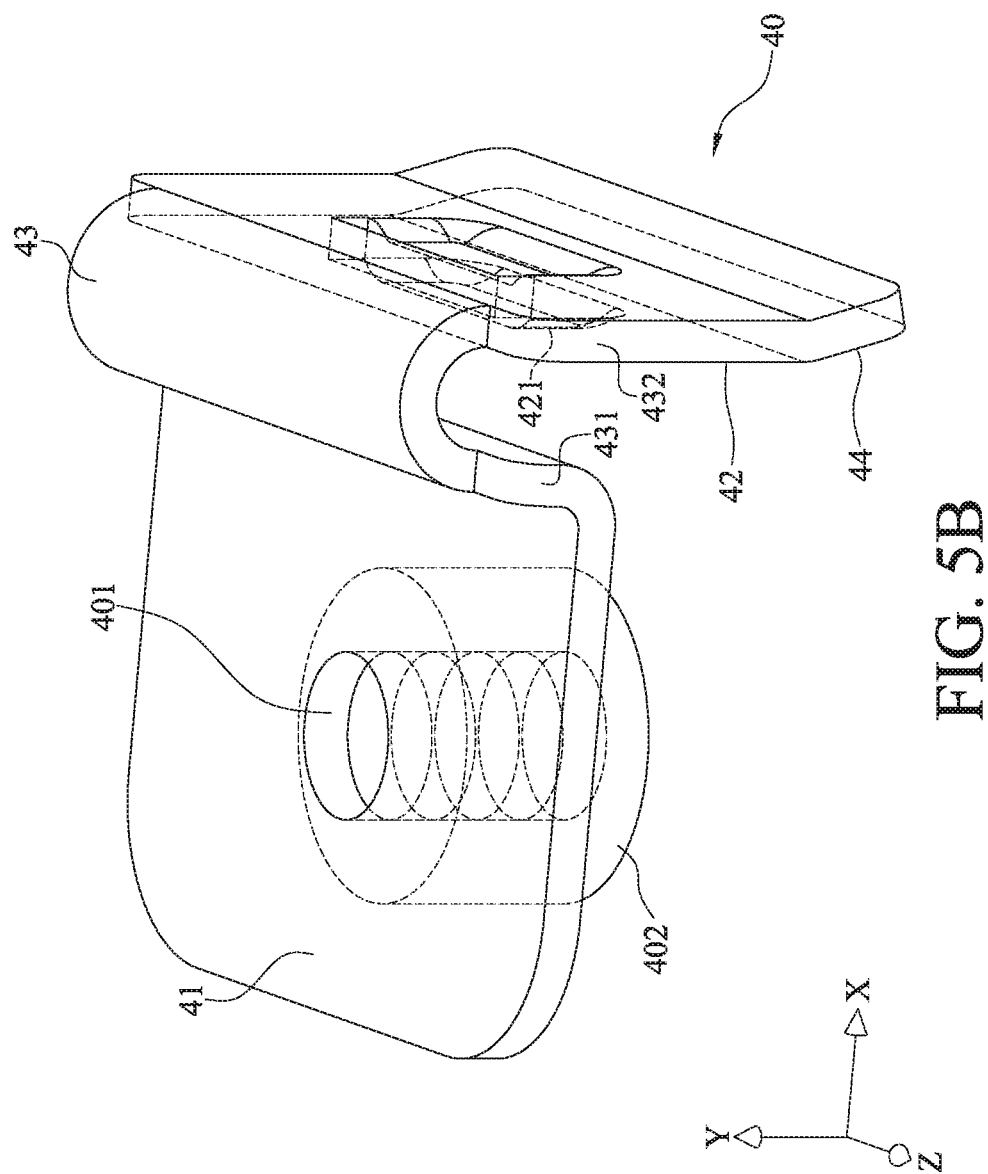
FIG. 5B is an enlarged view of the positioning structure in FIG. 4.

Refer to FIG. 5A and FIG. 5B. FIG. 5A is an exploded view of a frame and the position structure in FIG. 4, and FIG. 5B is an enlarged view of the positioning structure in FIG. 4. Besides the supporting part 41, the positioning structure 40 further includes a fixing member 42. The fixing member 42 is connected to the supporting part 41, and the fixing member 42 is detachably disposed on the second part 208 of the third side wall 203. In this embodiment and other embodiments of the present disclosure, the positioning structure 40 further includes a clamping part 43 and a handle part 44. The fixing member 42 is connected to the supporting part 41 through the clamping part 43. The clamping part 43 includes a first clamping part 431 and a second clamping part 432, and the clamping part 43 is flexible. When the positioning structure 40 is fixed on the second part 208, the clamping part 43 clamps onto the second part 208 by the first clamping part 431 and the second clamping part 432 respectively pressing against two opposite sides of the second part 208, such that the movement of the positioning structure 40 is restricted in the first direction D1.

According to the embodiment as shown in FIG. 5A and FIG. 5B, the second part 208 further has a first through hole 2081. The fixing member 42 of the positioning structure 40 further includes a fixing tab 421. The fixing member 42 is able to be fixed on the second part 208 when the fixing tab 421 is disposed through and fixed to the first through hole 2081, this enables the positioning structure 40 to be detachably fixed on the frame 20.

The positioning structure 40 includes the mounting part 402, and the supporting part 41 further has the mounting hole 401. The mounting part 402 has the inner threads on the mounting hole 401, such that a fastener (e.g., a screw) may be disposed through the mounting hole 401 and threaded into the inner threads so as to fix the second storage device 14 to the positioning structure 40.

The first part 207 and the second part 208 have a step therebetween. That is, the distance between the first part 207 and the second side wall 202 is different from the distance between the second part 208 and the second side wall 202. For instance, as shown in FIG. 5A, the distance Q1 between the first part 207 and the second side wall 202 is smaller than the distance Q2 between the second part 208 and the second side wall 202. In this embodiment and other embodiments of the present disclosure, the difference between the distance Q2 and the distance Q1 is sufficient to prevent a mechanical interference between the first storage device 13 and the positioning structure 40 when the first connector 301 is electrically connected to the first storage device 13 and to ensure the accommodation space 12 to have a sufficient volume to accommodate the positioning structure 40 if the second storage device 14 has a width close to the first side wall 201.

Before disposing the second storage device 14 onto the frame 20 to electrically connect the connecting end 141 of the second storage device 14 to the second connector 302, the supporting part 41 of the positioning structure 40 is oriented toward the second connector 302 when the positioning structure 40 is mounted on the second part 208 along a second direction D2 (i.e., −Y direction) which is perpendicular to the first direction D1. After the positioning structure 40 is settled, the second storage device 14 is able to be disposed in the accommodation space 12 in the first direction D1. In this configuration, the supporting part 41 extends toward the second connector 302, such that the supporting part 41 is able to support the free end 142 of the second storage device 14. In addition, the positioning structure 40 is fixed on the second part 208 through the clamping part 43 so that the movement of the positioning structure 40 is restricted in the first direction D1. Furthermore, the fixing tab 421 of the positioning structure 40 is disposed through and fixed into the first through hole 2081 in a direction towards the second connector 302, such that the movement of the positioning structure 40 is restricted in the second direction D2 and a third direction D3 (i.e., Z direction) which is parallel to an extension direction of the second side wall 202. By the clamping part 43 and the fixing tab 421, the positioning structure 40 is fixed in a desired position on the second part 208 which corresponds to the second connector 302.

When an external force is applied on the handle part 44 in a direction opposite to the first direction D1 (i.e., X direction) to deform the clamping part 43 and disengage the fixing tab 421 from the first through hole 2081, the positioning structure 40 is allowed to be detached from the second part 208.

Figure 6:
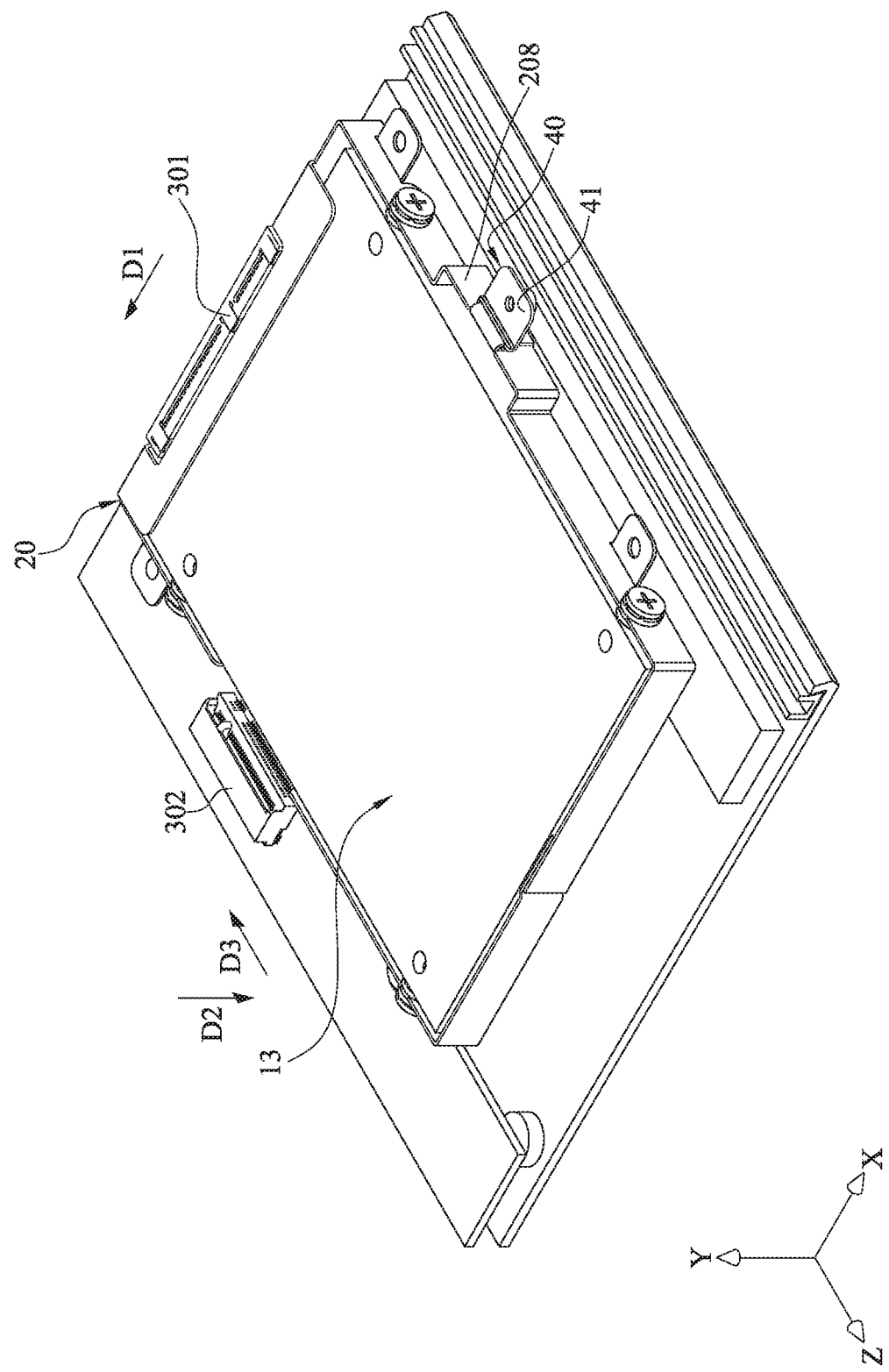
FIG. 6 is a perspective view showing that the first storage device in FIG. 2 is disposed on the accommodation structure in FIG. 4.

FIG. 6 is a perspective view showing that the first storage device in FIG. 2 is disposed on the accommodation structure in FIG. 4. As shown in FIG. 6, when it is attempted to dispose the first storage device 13 in the accommodation space 12 of the frame 20 and electrically connect the first storage device 13 to the first connector 301 after the second storage device 14 is disconnected from second connector 302, the positioning structure 40 can be detached from the second part 208 and then rotated 180 degrees about an axis Y to a not-in-use position, making the supporting part 41 facing in a direction away from the second connector 302 (i.e., in a direction opposite to the first direction D1), and then the positioning structure 40 can be moved in the second direction D2 so as to be fixed on the second part 208. That is, the supporting part 41 of the positioning structure 40 is rotated to a side of the second part 208 opposite to the accommodation space 12. After that, the first storage device 13 is allowed to be placed in the accommodation space 12 and moved in the third direction D3 to electrically connect to the first connector 301. Therefore, when the first storage device 13 is disposed in the accommodation space 12, the positioning structure 40 remains fixed on the frame 20 so that the positioning structure 40 is prevented from missing and is prevented from causing a mechanical interference with the first storage device 13.

Figure 7:
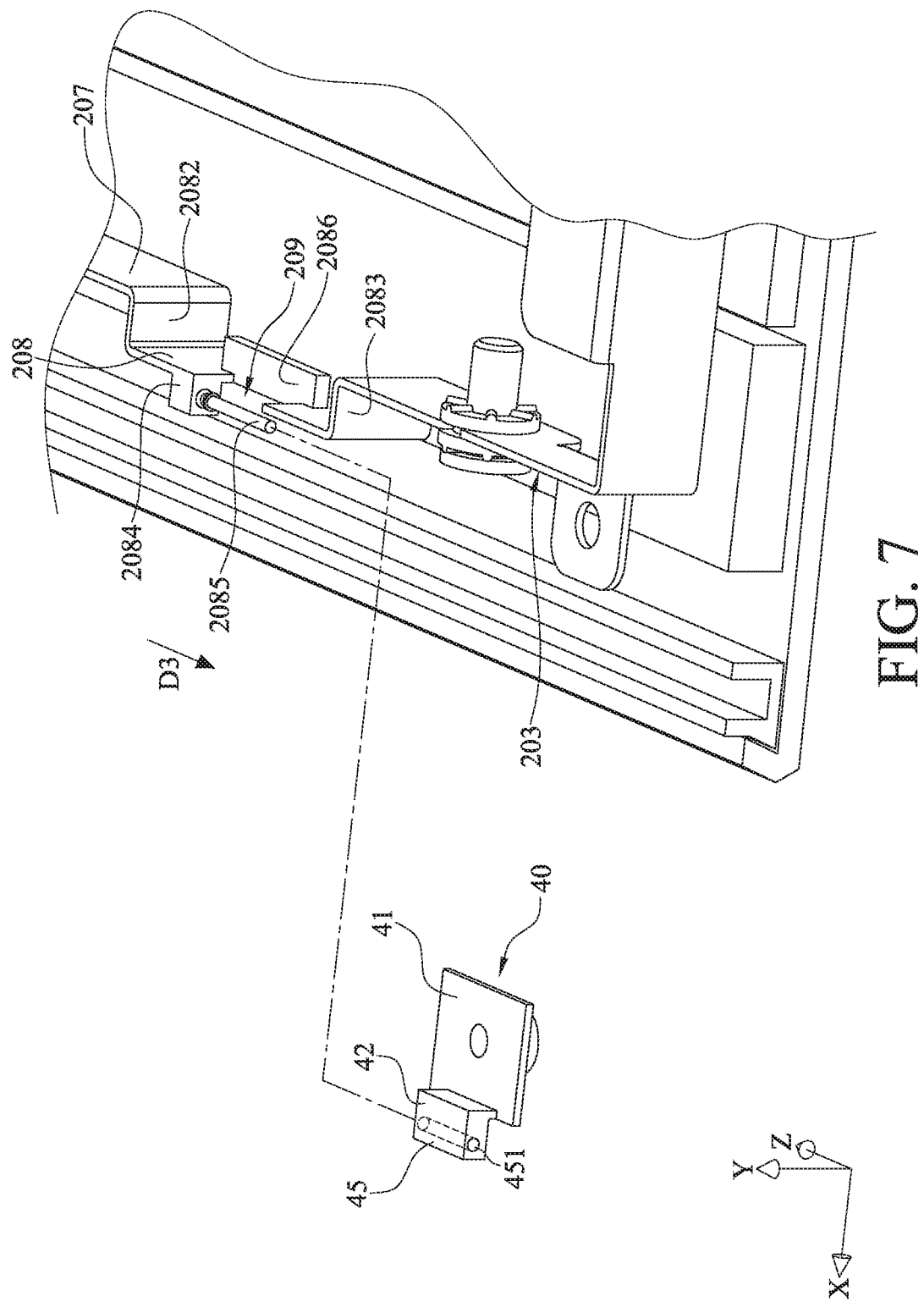
FIG. 7 is a perspective view of an accommodation structure and a positioning structure thereof in accordance with another embodiment of the disclosure.

According to the embodiment as shown in FIG. 7 and some embodiments of the present disclosure, the second part 208 further has a third opening 209, a first end part 2082 and a second end part 2083. The first end part 2082 and the second end part 2083 face each other and are respectively located on two opposite sides of the third opening 209. The accommodation structure 10 further includes a protruding part 2084 and a pivot 2085, the protruding part 2084 is located on the first end part 2082, and the pivot 2085 is located on the protruding part 2084. The protruding part 2084 protrudes from the first end part 2082 of the second part 208 in a direction away from the second connector 302 (i.e., X direction). The pivot 2085 extends in a direction opposite to the third direction D3 (i.e., −Z direction). The second part 208 further includes a stopper 2086 beneath the third opening 209. The stopper 2086 is able to support the supporting part 41 of the positioning structure 40.

Figure 8:
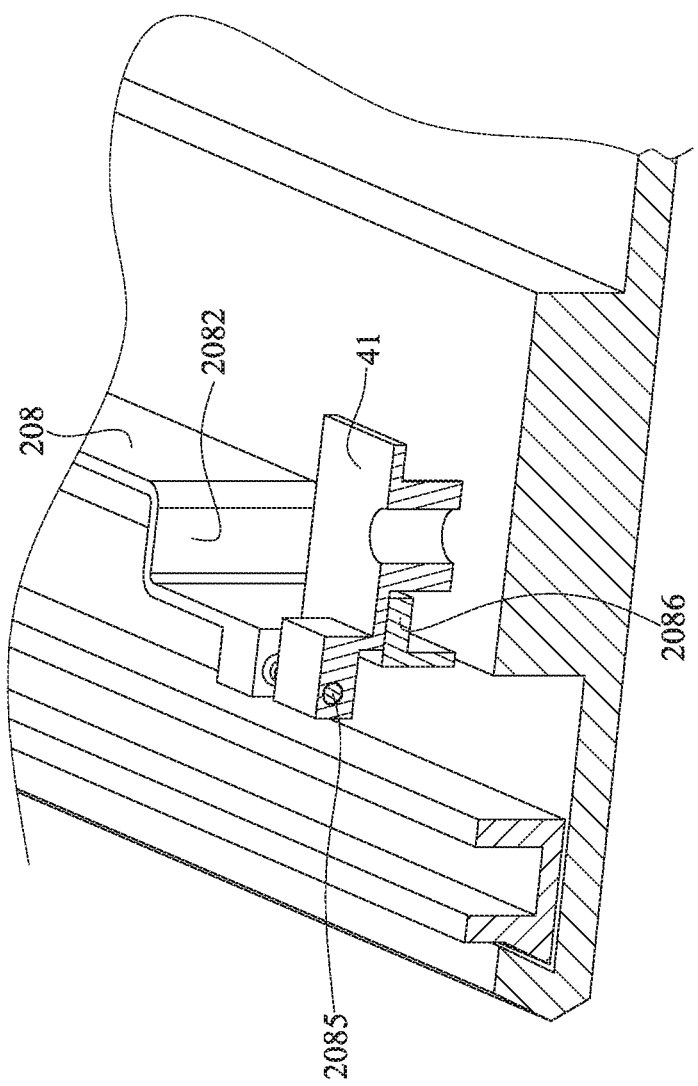
FIG. 8 is a perspective view of the positioning structure in FIG. 7 in an in-use position.
Figure 9:
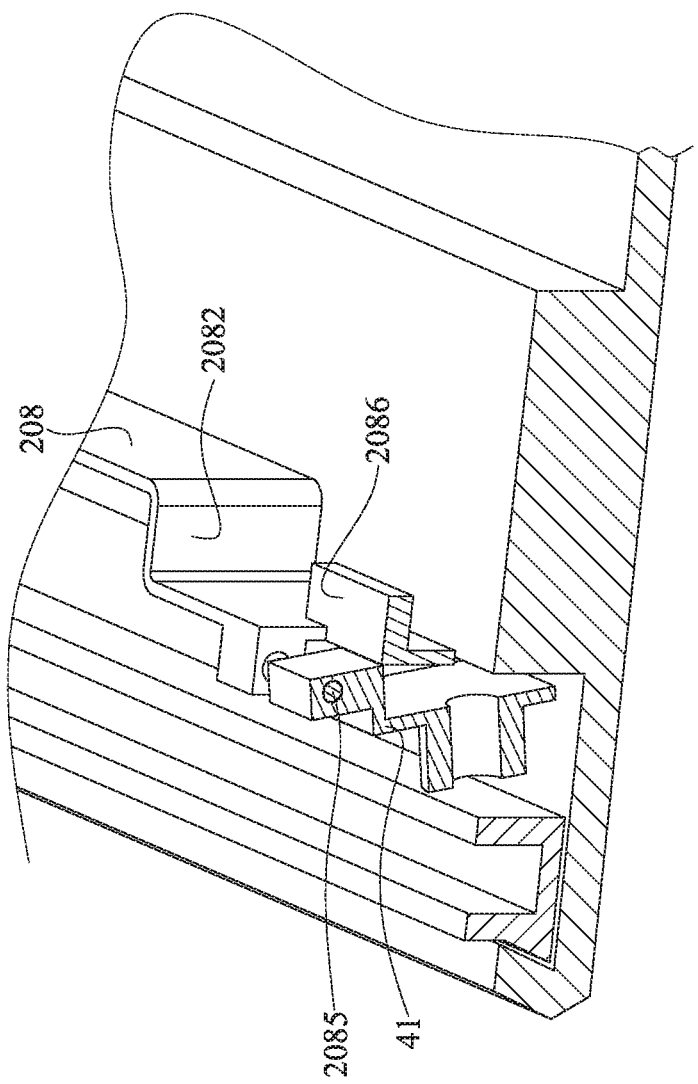
FIG. 9 is a perspective view of the positioning structure in FIG. 7 in a not-in-use position.

According to the embodiment as shown in FIG. 7, FIG. 8 and FIG. 9, the fixing member 42 of the positioning structure 40 further includes a pivoting part 45, and the pivoting part 45 has a second through hole 451. The pivot 2085 of the positioning structure 40 is disposed through the second through hole 451, such that the positioning structure 40 is movable between an in-use position and the not-in-use position. In another embodiment, the second through hole and the pivot may exchange their locations; that is, the second through hole is formed on the positioning structure while the pivot is disposed on the pivoting part.

Before disposing the second storage device 14 onto the frame 20 to electrically connect the connecting end 141 of the second storage device 14 to the second connector 302, the positioning structure 40 may be pivoted to the in-use position (as shown in FIG. 8). When the positioning structure 40 is in the in-use position, the positioning structure 40 is supported by the stopper 2086, such that the supporting part 41 of the positioning structure 40 is able to support the free end 142 of the second storage device 14 when the second storage device 14 is disposed in the accommodation space 12. On the other hand, before disposing the first storage device 13 in the accommodation space 12 of the frame 20 to electrically connect the first storage device 13 to the first connector 301, the positioning structure 40 is pivoted to the not-in-use position (as shown in FIG. 9), such that the supporting part 41 is located at the side of the second part 208 opposite to the accommodation space 12, thereby preventing a mechanical interference between the positioning structure 40 and the first storage device 13.

There is a step between the first part 207 and the second part 208. That is, the distance between the first part 207 and the second side wall 202 is different from the distance between the second part 208 and the second side wall 202. For instance, the distance between the first part 207 and the second side wall 202 is smaller than the distance between the second part 208 and the second side wall 202. According to the embodiment as shown in FIG. 7, FIG. 8 and FIG. 9 and other embodiments of the present disclosure, when the first storage device 13 is electrically connected to the first connector 301 and the positioning structure 40 is in the not-in-use position, the aforementioned step helps to prevent causing a mechanical interference between the first storage device 13 and the positioning structure 40 and to ensure the accommodation space 12 to have a sufficient volume to accommodate the positioning structure 40 if the second storage device 14 has a width close to the first side wall 201.

According to the accommodation structure and the electronic device as described above, since the first portion at least partially overlaps the second portion, users may selectively install at least two different types of storage devices into the same accommodation structure according to their requirements. This increases the flexibility of the internal space of the electronic device, such that the internal space of the electronic device can be efficiently utilized so as to optimize the internal space use.

In addition, the accommodation structure further includes the positioning structure to fix the storage devices.

Furthermore, the positioning structure may be detachable or pivotable, or may be integrated with the third side wall as a single piece.

Moreover, the aforementioned step not only helps to increase the structural stability but also prevents a mechanical interference between the positioning structure and the storage devices.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An accommodation structure, comprising:
a frame, comprising a first side wall, a second side wall and a third side wall, the second side wall and the third side wall respectively connected to two ends of the first side wall, the first side wall, the second side wall, and the third side wall cooperatively forming an accommodation space, the accommodation space being configured for selectively accommodating one of a first storage device and a second storage device;
a first connector, disposed on the first side wall of the frame, and configured to be connected to the first storage device; wherein when the first storage device is connected to the first connector, the first storage device occupies a first portion of the accommodation space;
a second connector, disposed on the second side wall of the frame, and configured to be connected to the second storage device; wherein when the second storage device is connected to the second connector, the second storage device occupies a second portion of the accommodation space; and
a positioning structure, disposed on the third side wall and located corresponding to the second connector on the second side wall, and configured for positioning a free end of the second storage device;
wherein at least part of the first portion of the accommodation space is part of the second portion of the accommodation space.

2. The accommodation structure according to claim 1, wherein the positioning structure comprises a supporting part configured for supporting the free end of the second storage device.

3. The accommodation structure according to claim 2, wherein the supporting part has a mounting hole for a fastener to be disposed therethrough so as to fix the free end of the second storage device in position.

4. The accommodation structure according to claim 1, wherein the third side wall comprises a first part and a second part, the first part is configured for fixing the first storage device in position, the positioning structure is disposed on the second part, and a distance between the first part and the second side wall is smaller than a distance between the second part and the second side wall.

5. The accommodation structure according to claim 1, wherein the positioning structure comprises a supporting part and a fixing member connected to the supporting part, the supporting part is configured for supporting the free end of the second storage device, and the fixing member is detachably disposed on the third side wall.

6. The accommodation structure according to claim 5, wherein the third side wall has a first through hole; the fixing member has a fixing tab, the positioning structure is detachably fixed on the frame when the fixing tab is disposed through and fixed to the first through hole.

7. The accommodation structure according to claim 6, wherein the fixing member comprises a handle part connected to the fixing tab, and the handle part is flexible; when the handle part is deformed and moved away from the third side wall by an external force, the fixing tab is disengaged from the first through hole by the handle part, such that the positioning structure is detached from the third side wall.

8. The accommodation structure according to claim 6, wherein the supporting part has a mounting hole for a fastener to be disposed therethrough so as to fix the free end of the second storage device in position.

9. The accommodation structure according to claim 6, wherein the third side wall comprises a first part and a second part, the first part is configured for fixing the first storage device in position, the first through hole is located at the second part, and a distance between the first part and the second side wall is smaller than a distance between the second part and the second side wall.

10. The accommodation structure according to claim 5, wherein the positioning structure comprises a clamping part configured to clamp onto the third side wall, and the positioning structure is detachably disposed on the third side wall when the clamping part clamps onto the third side wall.

11. The accommodation structure according to claim 5, wherein the fixing member comprises a pivoting part which is pivotally coupled to the third side wall.

12. The accommodation structure according to claim 11, wherein the third side wall has an opening, a first end part and a second end part, the first end part and the second end part are respectively located on two opposite sides of the opening; the accommodation structure further comprises a protruding part and a pivot disposed on the protruding part, the protruding part is located at the first end part and protrudes from the frame in a direction away from the second connector, the pivot extends from the protruding part towards the first side wall, the pivoting part has a second through hole, the pivot is disposed through the second through hole, such that the positioning structure is rotatably connected to the third side wall.

13. The accommodation structure according to claim 12, wherein the supporting part has a mounting hole for a fastener to be disposed therethrough so as to fix the free end of the second storage device in position.

14. The accommodation structure according to claim 13, wherein the third side wall comprises a first part and a second part, the first part is configured for fixing the first storage device in position, the second part is connected to the positioning structure, and a distance between the first part and the second side wall is smaller than a distance between the second part and the second side wall.

15. An electronic device, comprising:
a storage device, which is selected from a group comprising a first storage device and a second storage device;
a frame, comprising a first side wall, a second side wall and a third side wall, the second side wall and the third side wall respectively connected to two ends of the first side wall, the first side wall, the second side wall, and the third side wall cooperatively forming an accommodation space, the accommodation space being configured for accommodating the storage device;
a first connector, disposed on the first side wall of the frame; wherein when the storage device is the first storage device, the first connector is configured to be connected to the first storage device, and the first storage device is located at a first portion of the accommodation space;
a second connector, disposed on the second side wall of the frame; wherein when the storage device is the second storage device, the second connector is configured to be connected to the second storage device, and the second storage device is located at a second portion of the accommodation space; and
a positioning structure, disposed on the third side wall and located corresponding to the second connector on the second side wall, and configured for positioning a free end of the second storage device;
wherein at least part of the first portion of the accommodation space is part of the second portion of the accommodation space.

* * * * *